Patented Feb. 28, 1950

2,498,709

UNITED STATES PATENT OFFICE 2,498,709

AROMATIZATION CATALYSTS AND THE PREPARATION THEREOF

Richard M. Roberts, Berkeley, and Frank T. Eggertsen and Bernard S. Greensfelder, Oakland, Calif., assignors to Shell Development Company, San Francisco, Calif., a corporation of Delaware No Drawing. Application June 7, 1947, Serial No. 753,374

12 Claims. (Cl. 252—465)

This invention relates to new and improved aromatization catalysts and to their preparation. More particularly, the invention relates to new and improved catalysts which are particularly suitable for the production of aromatic hydrocarbons in gasoline fractions by treatment of said fractions under dehydrogenation conditions in the presence of hydrogen.

It is well known that petroleum fractions poor in aromatic hydrocarbons can be converted into fractions containing substantial amounts of aromatic hydrocarbons by treatment with certain dehydrogenation type catalysts under dehydrogenation conditions. Processes of this type have come into wide use for the production of aromatic hydrocarbons such, in particular, as highly aromatic blending stocks for aviation gasoline production, and pure aromatic hydrocarbons such as toluene for nitration, synthesis and other purposes. The aromatic hydrocarbons produced in these aromatization processes are produced by a number of different reactions or conversions, the most important of which are:

(1) Dehydrogenation of hydroaromatic naphthenes, (2) Dehydrocyclization of paraffins and olefins, and (3) Dehydroisomerization of non-hydroaromatic naphthenes.

Lesser amounts of aromatic hydrocarbons are also produced by cracking and dealkylation reactions.

While a large number of metal oxides, metal sulfides and mixtures thereof have been found which are effective to at least some extent in aromatizing gasoline fractions, only a few of these catalytic agents are of sufficient utility to receive consideration for commercial operation. At the present state of development, it is generally recognized that molybdenum oxide catalysts are the best for this purpose. The superiority of molybdenum oxide catalysts, apart from considerations of cost, stability and other such factors, is largely due to the ability of molybdenum oxide to actively catalyze the formation of aromatic hydrocarbons by several of the various possible reaction paths. It is not to be inferred, however, that all molybdenum oxide catalysts are suitable or equivalent for this purpose, since this is strictly not the case. The molybdenum oxide catalysts which are applied were developed empirically, with respect to composition and method of preparation, especially for this purpose.

In the empirical development of these catalysts, many mixtures of molybdenum oxides with other oxides supported on alumina were tried. In very few cases it was found that such combination catalysts (using the same support) produced a product having a somewhat higher octane number than molybdenum oxide-alumina alone (due to other reactions) and were thus superior for improving motor fuels, but, as far as known, none of such combinations were appreciably superior to molybdenum oxide-alumina alone when treating a gasoline fraction of appreciable boiling range under conditions to produce aromatic hydrocarbons by the combined competing reactions, as when treating 200° F.–400° F. straight-run gasoline fractions under relatively severe conditions to produce a highly aromatic product. It has now been found that catalysts superior to the known catalysts for this latter specific purpose are produced by incorporating specific minor amounts of zinc oxide or copper oxide in a particular manner in molybdena-alumina catalysts.

The catalysts of the present invention are catalysts of the supported type as opposed to the coprecipitated type catalyst, and are prepared by impregnating a suitable activated alumina base with the proper agents in the proper sequence. The alumina base used may be any adsorptive alumina base having a microporous structure affording an available surface of at least 100 square meters per gram and preferably above 150 square meters per gram. Thus, good catalysts can be prepared using activated selected bauxites, such as that presently available with the trade name "Porocel" (see Ind. Eng. Chem. 38, 839 (1946)) and British Guiana bauxite (see Ind. Eng. Chem., 37, 1148 (1945)) or the activatd aluminas of the grades, F—1, F—10 and F—11, produced by the Aluminum Ore Company (see Aluminum Company of America's "Activated Aluminas for Catalysts," December 2, 1943, and "Activated Aluminas," December 2, 1943). However, the preferred alumina base is an activated alumina gel. Various methods for producing highly active alumina gels are well known in the art, and such gels are available in commerce. Some characteristic properties of a particularly suitable gel are given in Example II.

In preparing the catalyst according to the present invention, the activated alumina base material is first impregnated with a specific minor amount of zinc nitrate, zinc acetate, or any other zinc salt easily convertible to the oxide as by calcining. The amount of zinc incorporated on the surface of the alumina base material by the impregnation is between 2% and 12% (between 2.5% and 15% ZnO) based on alumina (dry basis). The optimum amount of zinc within this range depends somewhat upon the particular alumina base material used and upon the amount of molybdenum subsequently incorporated. In general the amount of zinc is somewhat less than the amount of molybdenum.

After impregnating the alumina base material with the zinc compound, the material is calcined at a temperature of from about 500° C. to about 850° C. Preferred calcination temperatures are between about 600° C. and 800° C. In this calcination step the zinc is converted to zinc oxide which becomes relatively fixed on the alumina surface. If the alumina base used contains any appreciable amount of residual water, this is also largely removed in this calcination step.

After the impregnation with the zinc compound and the calcination step, the molybdenum is incorporated by one or more subsequent impregnations. Thus, the molybdenum oxide is incorporated on top of the zinc. The molybdenum oxide may be incorporated by any of the conventional methods for impregnating an alumina base with molybdenum oxide. The amount of molybdenum to be incorporated by impregnation may vary from about 4% to about 20% by weight, based on the alumina (dry basis). However, concentrations of 12%±6%, give the optimum results and are preferred. In order to incorporate these amounts of molybdenum, it is usually necessary to impregnate twice. The molybdenum is present in the catalyst in the oxide form. The limiting concentrations expressed in terms of $MoO_2$ are from about 5.3% to about 27% and the preferred concentrations are 16%±8%.

In a preferred embodiment the alumina base is activated to a residual water content between about 5% and 14% prior to the impregnation with the zinc compound. Further activation of the base to a water content in the order of 0.2% to 2% then takes place in the mentioned calcination treatment after the impregnation with the zinc compound. Thus, in this embodiment the zinc is impregnated into the partially activated alumina, whereas the molybdenum is impregnated into the substantially completely dehydrated alumina.

After drying and calcining to convert the molybdenum compound to molybdenum oxide, the catalyst may be used directly in the treatment of gasoline to produce aromatic hydrocarbons. If desired, it may, however, be given any of the conventional pretreatments, as, for example, a partial reduction with hydrogen to reduce or eliminate the small induction period frequently encountered when employing the unpretreated catalyst.

It has been found that copper oxide when applied in place of the zinc oxide in the same manner exerts a similar but lesser effect. Thus, although the zinc-containing catalyst is preferred, an excellent catalyst which is superior to the known catalysts may be prepared by the same method, using copper in place of zinc.

The catalysts prepared as described can be employed in place of the conventional molybdena-alumina catalyst in any of the processes where these latter catalysts are used to produce aromatic hydrocarbons in gasoline fractions. They are particularly suitable, however, in such processes where gasoline fractions are treated under relatively severe conditions to produce a product containing upward of 50% by weight of aromatic hydrocarbons.

Suitable conditions, by way of example, are as follows:

| | |
|---|---|
| Temperature | 450° C.–550° C. |
| Pressure | 300–3000 p. s. i. g. |
| Liquid hourly space velocity | 0.5–3.0 |
| Hydrogen | 2500–7500 cu. ft./bbl. of feed. |

EXAMPLE I

A catalyst (our number 52) was prepared as follows:

The alumina base used was a pure alumina gel powder. The powder was formed into pills which were then broken up into 8–14 mesh fragments or granules. The alumina had a specific surface of about 196 m.²/g. and a bulk density of about 0.86 g./cc.

The granules were impregnated with a solution of zinc nitrate, and then calcined at about 750° C. for about 2 hours. The calcined material was then impregnated with a solution of ammonium molybdate and dried at about 110° C.–120° C. The granules were then placed in a tube and hydrogen gas was passed over them while the temperature was raised to about 510° C. during the course of one hour. The catalyst thus prepared contained about 3.4% Zn and about 9.5% Mo.

This catalyst was used for the aromatization of a 290° F.–400° F. fraction of straight-run gasoline containing about 15.7% of aromatic hydrocarbons. The conditions were as follows:

| | |
|---|---|
| Temperature | about 510° C. |
| Pressure | about 500 p. s. i. g. |
| Liquid hourly space velocity | about 1 |
| Hydrogen feed rate | about 5000 cu. ft./bbl. |

After 100 hours of use the aromatic content of the debutanized liquid product was about 56.2%.

EXAMPLE II

Catalyst (our number 601) was prepared as follows:

The activated alumina base used was an activated alumina gel having the following properties:

| | |
|---|---|
| Loss on ignition | about 9.7 percent |
| Bulk density | about .72–78 g./cc. |
| Gel density | about 1.37 g./cc. |
| Available surface | about 350–400 m.²/g. |
| Average pore diameter | about 52–62 A° |

Granules of this dried gel (8–14 mesh) were impregnated with a solution of zinc nitrate and then calcined for 2 hours at about 750° C. The calcined material was then impregnated with a solution of ammonium molybdate, and dried at 110° C.–120° C. The catalyst was then placed in a reaction tube and hydrogen gas was passed through the tube while heating to 510° C. over a period of one hour. The catalyst thus prepared contained about 5.4% Zn and about 10.4% Mo.

This catalyst was used under the conditions described in Example I. After 100 hours of use the aromatic content of the debutanized liquid product was about 62.4%.

Other catalysts were prepared in the same manner with different concentrations of zinc and molybdenum. The concentrations of zinc and molybdenum and the aromatic contents of the debutanized liquid products after 100 hours of use under the described conditions were as follows:

Table I

| Catalyst | Percent Zn | Percent Mo | Percent Aromatics |
|---|---|---|---|
| 601 | 4.9 | 9.5 | 62.4 |
| 51 | 5.2 | 19.2 | 60.9 |
| 614 | 9.1 | 10.4 | 61.6 |

EXAMPLE III

A catalyst (our number 56) was prepared using an alumina gel powder. The powder was formed into ⅛-inch pellets. The alumina had a bulk density of about 0.69 g./cc., and an available surface of about 295 m.²/g. The loss on ignition was about 8.3%.

The material was impregnated with zinc nitrate and then calcined at about 700° C. for about 5 hours. The material was then impregnated with ammonium molybdate, dried, and reduced as described in Example I. The finished catalyst contained about 5.1% Zn and about 11.6% Mo.

The catalyst was used under the same conditions as described in Example I. After 100 hours of use the aromatic content of the debutanized liquid product was about 54.9%.

EXAMPLE IV

A catalyst (our number 57) was prepared as follows:

The alumina used was activated British Guiana bauxite having a bulk density of about 1.00 g./cc., a surface area of about 248 m.²/g., and a loss on ignition of about 12.74%.

This alumina was impregnated with zinc nitrate and then calcined at about 700–750° C. for about 2 hours. The material was then impregnated with ammonium molybdate, dried, and reduced as described in Example I. The catalyst contained about 5.4% Zn and about 11.0% Mo.

This catalyst was used under the same conditions as described in Example I. After 100 hours of use the aromatic content of the debutanized liquid product was about 54.6%.

The results obtained with the above catalysts are compared in the following Table II with those obtained with catalysts prepared by impregnating the same base materials with comparable amounts of molybdenum. The methods of preparation and handling were the same in each case, except that the impregnation with the zinc nitrate and the subsequent calcination prior to impregnating with ammonium molybdate were omitted.

Table II

| Catalyst | Per Cent Zn | Per Cent Mo | Alumina Base of Example | Aromatics, Per Cent b. w. | Yield, Per Cent b. w. Debutanized Liquid Product |
|---|---|---|---|---|---|
| 52 | 3.4 | 9.5 | I | 56.2 | 80.1 |
| 558 | | 10.7 | I | 51.0 | 81.3 |
| 601 | 5.4 | 10.4 | II | 62.4 | 76.8 |
| 591a | | 13 | II | 57.7 | 77.0 |
| 56 | 5.1 | 11.6 | III | 54.9 | 82.5 |
| 561 | | 9.4 | III | 49.3 | 82.5 |
| 57 | 5.4 | 11.0 | IV | 54.6 | 80.8 |
| 594 | | 13.1 | IV | 49.2 | 83.2 |

EXAMPLE V

A catalyst (our number 607) was prepared as described in Example II, except that copper nitrate was substituted for zinc nitrate. The catalyst contained about 5.4% Cu and 10.5% Mo.

This catalyst, when tested under the same conditions described in Example I, gave a debutanized liquid product after 100 hours of operation containing about 59.2% aromatics.

It is seen that in each case the improved catalyst produced a product having about 5% more aromatic hydrocarbons, and allows the production of products containing well over 50% aromatics. It will also be seen that the improved catalyst affords the increased aromatic production without any appreciable reduction in yield of product.

Other catalysts were prepared using the alumina base described in Example II, in which the zinc was impregnated first, but the described calcination step was omitted, and also catalysts in which the zinc was impregnated simultaneously with the molybdenum from a mixed solution. When these catalysts were tested it was found that the aromatic content of the product was not appreciably increased by the presence of the zinc, as in the above-described catalysts in which the zinc is incorporated and the material calcined prior to incorporating the molybdenum. The aromatic contents of the debutanized liquid products during 100 hours, when treating a 300° F.–460° F. straight-run gasoline fraction with such catalysts under the following conditions, are shown in Table III.

Temperature _____ 516° C.
Pressure _____ about 700 p. s. i. g.
Liquid hourly space velocity about 1
Hydrogen _____ about 5000 cu. ft./bbl.

Table III

| Catalyst | Per Cent Zn | Per Cent Mo | Per Cent Aromatics |
|---|---|---|---|
| 126b | none | 9.6 | 62.4 |
| 114 | 8 | 12 | 63.1 |
| 165 | 5 | 10 | 59.7 |

Also, catalysts were prepared using the alumina base described in Example II in which other metal oxides were substituted for the zinc oxide. Except in the case of copper oxide, which gave lower but good yields of aromatic hydrocarbons, all of them were considerably less active for aromatic formation than the described zinc-containing catalysts. The aromatic contents of the debutanized liquid products obtained with some of them after 100 hours use are shown in Table IV.

Table IV

| Catalyst | Added Agent | Per Cent Mo | Per Cent Aromatics |
|---|---|---|---|
| 608 | 5% K | 10 | 34.4 |
| 53 | 2% Be | 10 | 54.2 |
| 613 | 5% Ag | 11 | 50.8 |
| 119 | | ¹7 | 46.2 |

¹ Impregnated in Zn-Al spinel base.

The test conditions were those shown in Example I.

Thus, the improvement in the catalysts has been found when using various activated alumina bases, but only when the zinc (or copper) and molybdenum have been incorporated in the described sequence, manner and concentrations. Due to the fact that the specific method of preparation is at least as important as the chemical composition of the catalyst and to the fact that very little is known regarding the promoting action of materials in these catalysts—other than the facts found empirically in specific cases—no explanation as to the causes of the results observed and discussed is presented.

We claim as our invention:

1. A process for the production of a catalyst having aromatizing properties which comprises impregnating an activated alumina with a nitrate of a metal selected from the group consisting of zinc and copper in an amount corresponding to between 2% and 12% of the metal, calcining the mixture at a temperature between 500° C. and 850° C., then impregnating the mixture with ammonium molybdate in an amount equivalent to between 4% and 20% of molybdenum, and finally converting the impregnated molybdenum to molybdenum oxide.

2. A process for the production of a catalyst having aromatizing properties which comprises impregnating an activated alumina with an amount of zinc nitrate corresponding to between 2% and 12% of zinc, calcining the mixture at a temperature between 500° C. and 850° C., then impregnating the mixture with ammonium molybdate in an amount equivalent to between 4% and 20% of molybdenum, and finally converting the impregnated molybdenum to molybdenum oxide.

3. A process for the production of a catalyst having aromatizing properties which comprises impregnating an activated alumina with an amount of zinc nitrate corresponding to between 2% and 12% of zinc, calcining the mixture at a temperature between 500° C. and 850° C., then impregnating the mixture with such an amount of ammonium molybdate that the amount of molybdenum incorporated is in excess of the amount of zinc incorporated and about 12% ±6%, and finally converting the impregnated molybdenum to molybdenum oxide.

4. A process for the production of a catalyst having aromatizing properties which comprises impregnating an activated alumina with an amount of zinc nitrate corresponding to between 2% and 12% of zinc, calcining the mixture at a temperature between 600° C. and 800° C., then impregnating the mixture with ammonium molybdate in an amount equivalent to between 4% and 20% of molybdenum, and finally converting the impregnated molybdenum to molybdenum oxide.

5. A process according to claim 2 in which the activated alumina is one having a residual water content between 5% and 14%.

6. In the preparation of a supported molybdena-alumina catalyst promoted by a minor amount of zinc oxide the improvement which comprises impregnating an activated alumina base with between 2% and 12% of zinc in the form of a compound convertible to the oxide by heating, calcining the mixture at a temperature between 500° C. and 850° C., and then impregnating the calcined mixture with between 5.3% and 27% of molybdenum oxide.

7. In the preparation of a supported molybdena-alumina catalyst promoted by a minor amount of zinc oxide the improvement which comprises impregnating an activated alumina base with between 2% and 12% of zinc in the form of a compound convertible to the oxide by heating, calcining the mixture at a temperature between 600° C. and 800° C. and then impregnating the calcined mixture with between 5.3% and 27% of molybdenum oxide, the amount of molybdenum being in excess of the amount of zinc.

8. In the preparation of a supported molybdena-alumina catalyst promoted by a minor amount of zinc oxide the improvement which comprises impregnating an activated alumina base having a residual water content between 5% and 14% with between 2% and 12% of zinc in the form of a compound convertible to the oxide by heating, calcining the mixture at a temperature between 500° C. and 850° C., and then impregnating the calcined mixture with between 5.3% and 27% of molybdenum oxide.

9. A supported molybdenum oxide on alumina catalyst promoted for aromatization activity by a minor amount of zinc oxide and prepared as specified in claim 2.

10. A supported molybdenum oxide-on-alumina catalyst promoted for aromatization activity by a minor amount of zinc oxide and prepared as specified in claim 7.

11. A process for the production of a catalyst having aromatizing properties which comprises impregnating an activated alumina with an amount of copper nitrate corresponding to between 2% and 12% of copper, calcining the mixture at a temperature between 500° C. and 850° C., then impregnating the mixture with ammonium molybdate in an amount equivalent to between 4% and 20% of molybdenum, and finally converting the impregnated molybdenum to molybdenum oxide.

12. A supported molybdenum oxide-on-alumina catalyst promoted for aromatization activity by a minor amount of copper oxide prepared as specified in claim 11.

RICHARD M. ROBERTS.
FRANK T. EGGERTSEN.
BERNARD S. GREENSFELDER.

REFERENCES CITED

The following references are of record in the file of this patent:

UNITED STATES PATENTS

| Number | Name | Date |
| --- | --- | --- |
| 2,371,087 | Webb et al. | Mar. 6, 1945 |
| 2,410,891 | Meinert et al. | Nov. 12, 1946 |
| 2,422,172 | Smith et al. | June 10, 1947 |
| 2,422,372 | Smith et al. | June 17, 1947 |